United States Patent [19]
Fraselle et al.

[11] Patent Number: 4,768,872
[45] Date of Patent: Sep. 6, 1988

[54] EYEGLASS FRAME COMPRISING A VARIABLE LENGTH MEMBER

[75] Inventors: Michel Fraselle, Saint-Maur; Bernard Lhospice, Blois; Claude Romanet, La Varenne Saint Hilaire, all of France

[73] Assignee: Essilor International Compagnie Generale d'Optique, Creteil, France

[21] Appl. No.: 12,953

[22] Filed: Feb. 10, 1987

[30] Foreign Application Priority Data

Feb. 12, 1986 [FR] France .................. 86 01894

[51] Int. Cl.$^4$ .......... G02C 5/20; G02C 5/14; G02C 5/04
[52] U.S. Cl. .................. 351/118; 351/119; 351/128
[58] Field of Search .......... 351/41, 80, 88, 118, 351/128, 137, 138, 140, 148, 149, 119

FOREIGN PATENT DOCUMENTS
8502688  6/1985  PCT

OTHER DOCUMENTS

"Les Alliages A. Memoire De Form", Sciences & Techniques, no. 16, June 1985

*Primary Examiner*—Rodney B. Bovernick
*Assistant Examiner*—Jay Ryan
*Attorney, Agent, or Firm*—Charles E. Brown; Charles A. Brown

[57] ABSTRACT

An eyeglass frame comprises a variable length member made up of two parts adapted to be inserted one inside the other to a variable distance. At least one shape memory alloy ring or sleeve member is mounted on one of these two parts. The ring or sleeve member is adapted to immobilize the two parts relative to each other at ambient temperature.

5 Claims, 1 Drawing Sheet

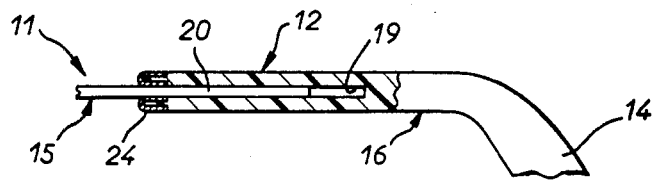
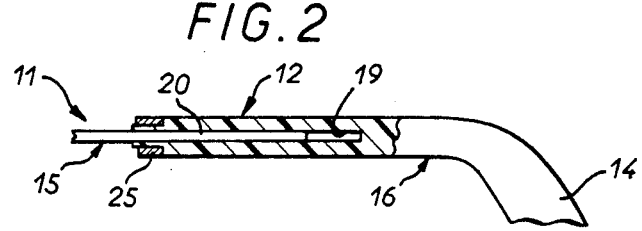
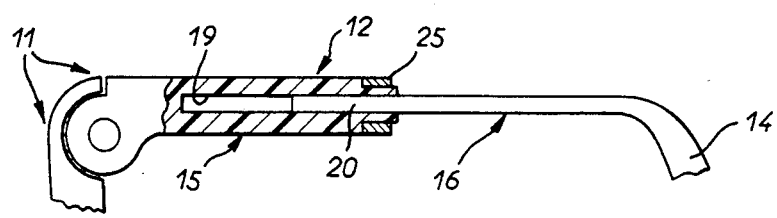
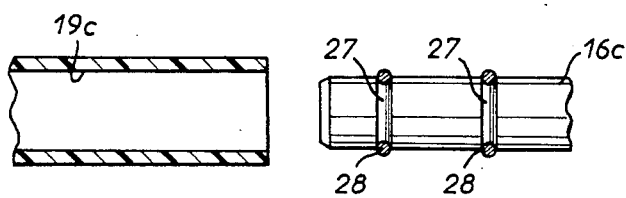
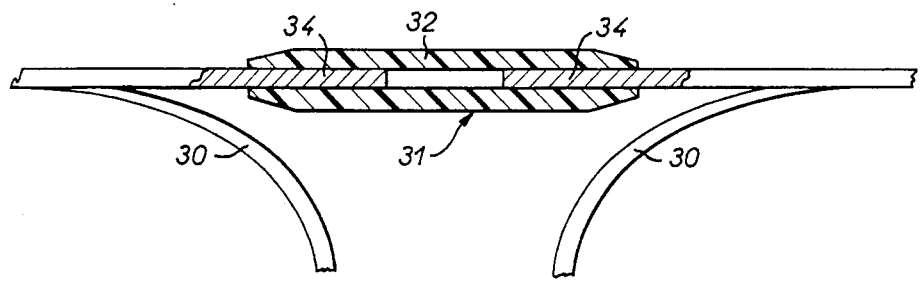

EYEGLASS FRAME COMPRISING A VARIABLE LENGTH MEMBER

BACKGROUND OF THE INVENTION

1. Field of the Invention

The invention concerns an eyeglass frame comprising at least one variable length member and is more particularly concerned with an improvement exploiting the properties of shape memory alloys and in particular making it possible, by means of an unusually simple arrangement, to adjust easily and accurately the length of the temples according to the shape of the user's head, the adjustment being retained with a greater force than in prior art devices. The same principle applies to adjusting the bridge of the eyeglass frame.

2. Description of the Prior Art

There are known eyeglass frames with adjustable temples comprising, for example, two parts adapted to slide one inside the other over a certain distance and to be immobilized relative to each other in a selected position using some form of gripping means. Thus French patent No. 679 208 discloses a system of this kind in which a cap is screwed onto one end of one part of each temple to clamp a wedging ring deformation of which immobilizes the other part of the temple.

Such devices are costly and are not entirely satisfactory given that the clamping means may be loosened, whereby the adjustment is lost.

The invention proposes a new and simpler arrangement that is truly unreleasable under normal conditions of use, specifically over a wide range of ambient temperatures. The invention constitutes an application of shape memory alloys that have been commercially available for a number of years. An overview of the properties of such alloys is given, for example, in the journal "Sciences et Techniques" of June 1985, No 16. It is known that a member formed from an alloy of this kind has the property of resuming a given shape as the result of a variation in temperature or the application of stresses. The dimensions of an object may be varied to a significant degree (between 5 and 8%) in response to a relatively modest increase or decrease in temperature, before resuming the "stored" initial state when the object is returned to its original temperature.

This kind of property can be exploited, depending on the type of alloy and how it is used, either by heating or by cooling and in order to produce either an expansion or a shrinkage; it is exploited to obtain what might be termed a binding action that is easy to implement, notably in an optometrist's store and preferably using a cooling device.

PCT application No. WO 85/02688 proposes eyeglass frames incorporating such alloys. The invention proposes a solution of the same type that is less costly.

SUMMARY OF THE INVENTION

The invention consists in an eyeglass frame comprising a variable length member made up of at least two parts adapted to be inserted one inside the other to a variable distance and at least one shape memory alloy ring or sleeve member mounted on one of said at least two parts and adapted to immobilize them relative to each other at ambient temperature.

Because the or each shape memory alloy member is just a ring or sleeve the eyeglass frames can be made less costly by virtue of the small quantity of alloy employed.

The invention will be better understood and other advantages of the invention will emerge more clearly from the following description of numerous eyeglass frames in accordance with the invention given by way of example only and with reference to the appended drawings.

BRIEF DESCRITPION OF THE DRAWINGS

FIGS. 1 through 3 show in partial cross-section eyeglass frames in accordance with the invention.

FIG. 4 is a partial view in cross-section of an alternative embodiment.

FIG. 5 shows an eyeglass frame in accordance with the invention comprising an adjustable bridge between the two lenses.

DESCRIPTION OF THE PREFERRED EMBODIMENTS

FIGS. 1 through 3 are partial views of an eyeglass frame 11, in particular one temple 12 thereof. This temple is in two parts 15 and 16, one (15) carrying a hinge member (not shown in FIGS. 1 and 2) and the other (16) carrying a spatula 14. The two parts of the temple are shaped so that one fits inside the other to a distance that is variable. To this end the temple part 16 (FIGS. 1 and 2) or the temple part 15 (FIG. 3) is formed with a bore 19 open at one end so that a straight part 20 of the temple part 15 or 16 can be inserted into it.

In accordance with the invention a shape memory alloy member in the form of a small clamping ring is mounted on one of the two temple parts 15 or 16. The resulting frames are inexpensive because of the small quantity of shape memory alloy used.

Thus, in FIGS. 1 and 2, the temple part 15 is essentially a metal rod sliding in a bore 19 defined in the spatula-shaped temple part 16. For each embodiment a respective ring 24 or 25 is mounted over the open end of the bore 19. In the FIG. 2 embodiment the ring 25 is a simple section of cylindrical tube whereas in the FIG. 1 embodiment the ring 24 has a U-shaped cross-section and is fitted over the end of the bore 19 to improve the appearance of the frame. The alloy is preferably such that the length can be adjusted at low temperature and is stable at ambient temperature as a result of the ring shrinking.

FIG. 3 shows a converse arrangement to that of FIG. 2 in which the temple part 15 is of plastics material and has the bore 19 formed in it. The temple part 16 comprises a metal rod inserted into the bore 19 and the shape memory alloy ring 25 is mounted at the end of the temple part 15.

FIG. 4 shows another embodiment in which one of the temple parts comprises a rod member 16c adapted to be inserted into a bore 19c in the other temple part. The straight end part of the rod member 16c comprises at least one and preferably two spaced grooves 27 each accommodating a shape memory alloy ring 28. The shape and size of the bore 19c are such that it can receive the rod member 16c fitted with the rings 28 at low temperature.

Finally, FIG. 5 shows the application of the invention to another member of the frame, namely the bridge 31 determining the distance between the rim or surround parts 30 adapted to receive the lenses. The solution shown is inexpensive since a central sleeve 32 of shape memory alloy receives at each end a straight rod member 34 joined to one of the rims 30, so that the distance between the lenses can be adjusted as required. This reduces the size of the stock of frames to be maintained by the manufacturer and the distributor.

It is to be understood that all the embodiments described with reference to FIGS. 1 through 4 may have the adjustable bridge incorporated into them.

In all the examples described above the shape memory alloys may be chosen from the group comprising: Ti Ni, Cu Zn Al, Cu Al Ni and Cu Al Zn.

There is claimed:

1. Eyeglass frame comprising a variable length member made up of at least two parts adapted to be inserted one inside the other to a variable distance and at least one shape memory alloy ring or sleeve member mounted on one of said at least two parts and adapted to immobilize them relative to each other at ambient temperature.

2. Eyeglass frame according to claim 1, wherein two of said at least two parts form a temple, one of said two parts is formed with a bore adapted to receive the other of said two parts, and said ring or sleeve member has a U-shaped cross-section and is fitted over the end of said one part around the opening of said bore.

3. Eyeglass frame according to claim 1, wherein two of said at least two parts form a temple, one of said two parts has a grooved terminal section adapted to receive at least one shape memory alloy ring member, and the other of said two parts comprises a bore adapted to receive said one part together with said at least one ring member.

4. Eyeglass frame according to claim 1, comprising a brige and two rims, wherein said variable length member is said bridge of said eyeglass frame and comprises a center sleeve of shape memory alloy adapted to receive at each end a straight rod member attached to one of said rims of said eyeglass frame.

5. Eyeglass frame according to claim 1, wherein the length of said variable length member is varied by movement of said inserted one part within said other part when the dimensions of said shape memory alloy member at low temperature frees said at least two parts relative to each other.

* * * * *